United States Patent Office 3,073,447
Patented Jan. 15, 1963

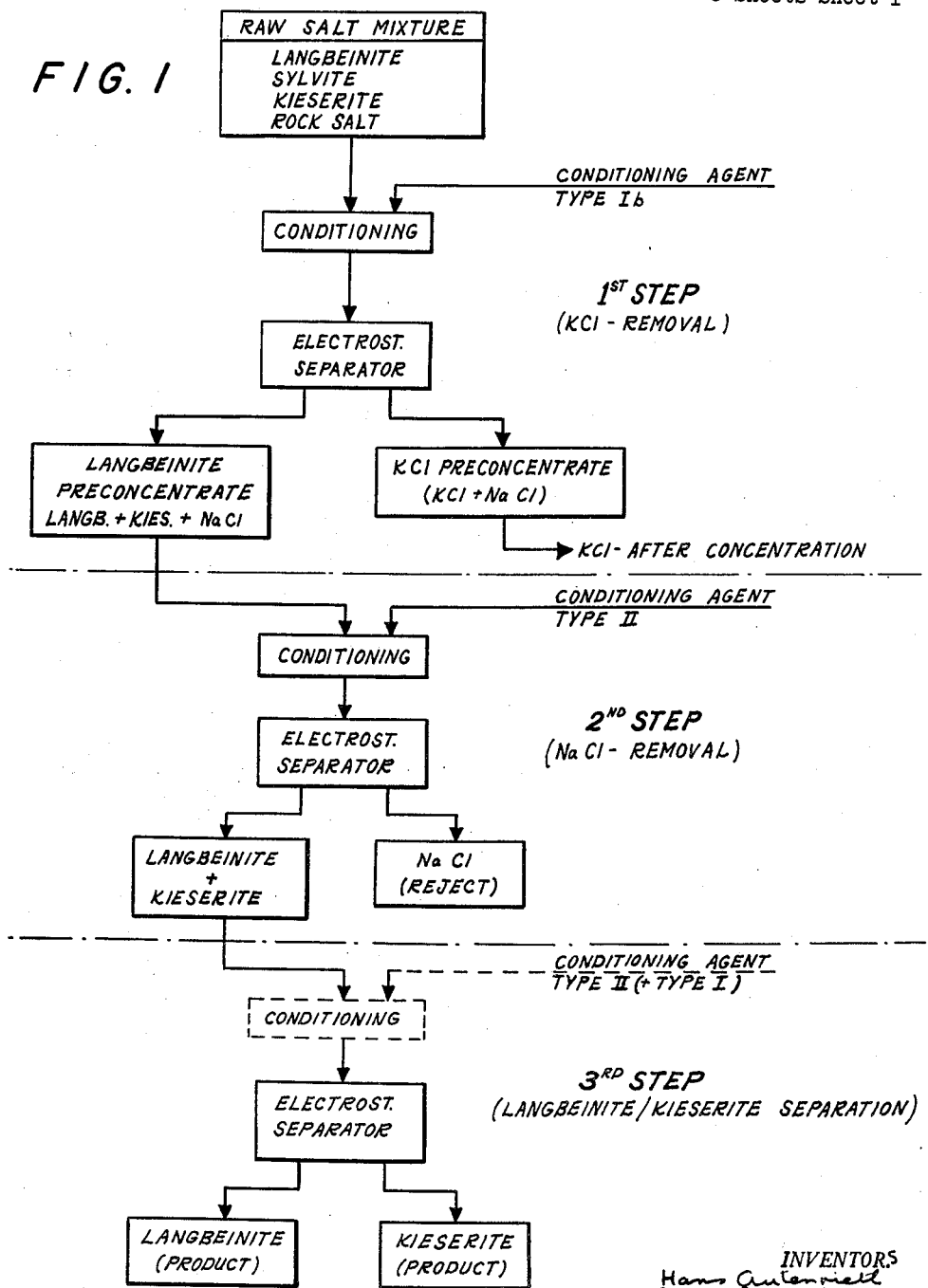

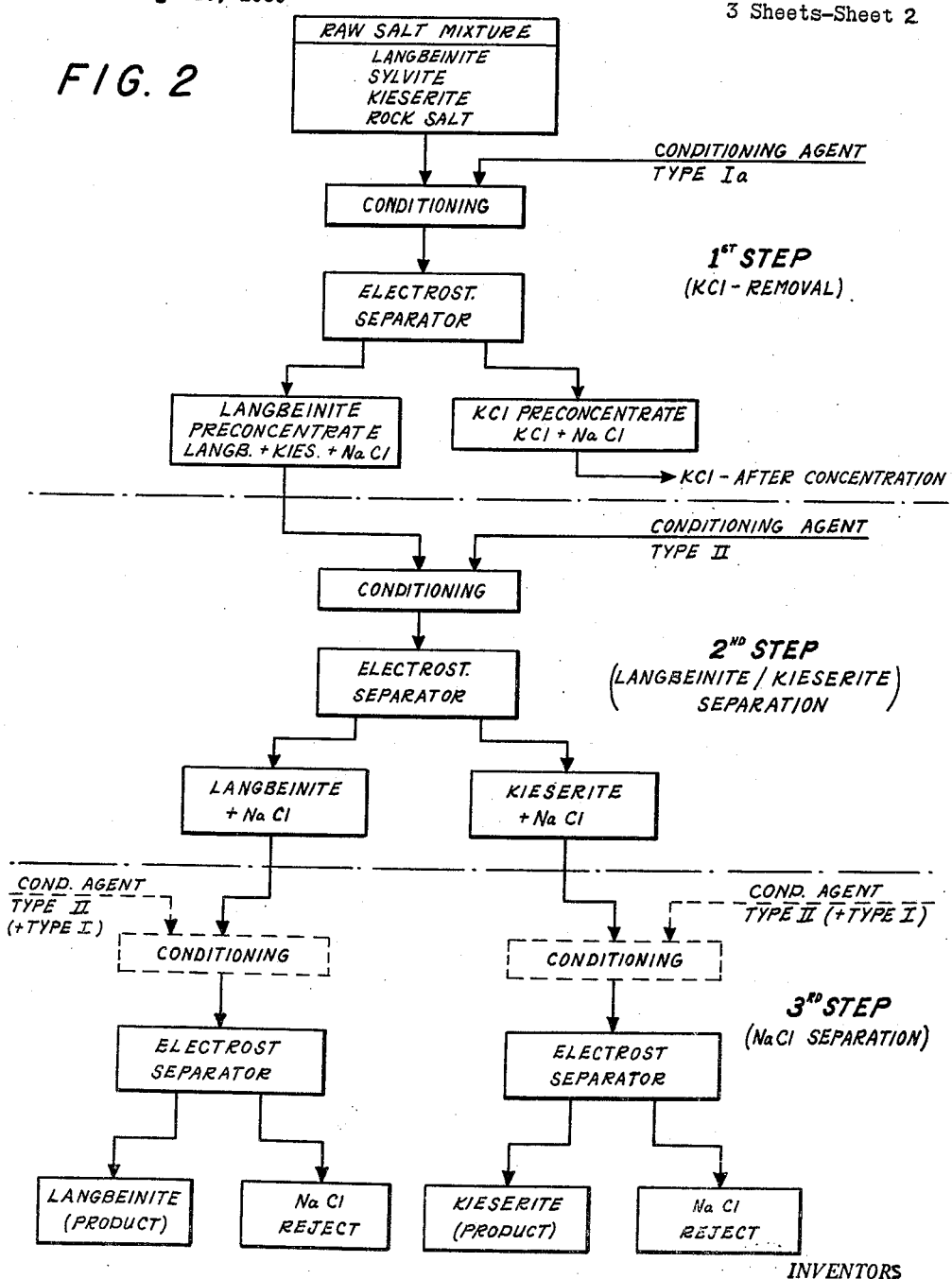

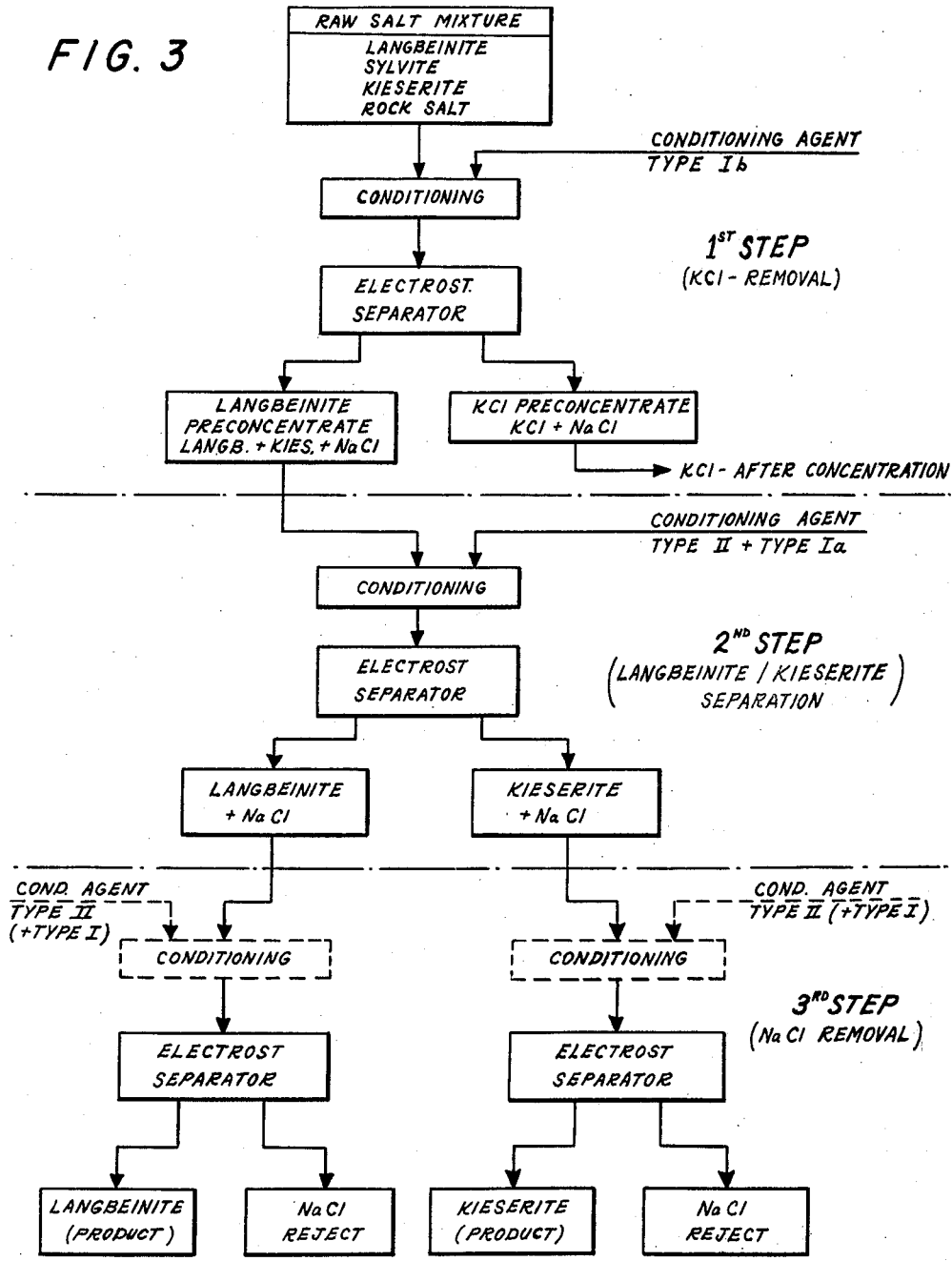

3,073,447
ELECTROSTATIC SEPARATION
Hans Autenrieth, Hannover-Kirchrode, and Gerd Peuschel, Bemthe, Hannover, Germany, assignors to Kali-Forschungs-Anstalt G.m.b.H., Hannover, Germany
Filed Aug. 10, 1959, Ser. No. 832,529
Claims priority, application Germany Sept. 30, 1958
8 Claims. (Cl. 209—127)

The present invention relates to the electrostatic separation of potassium-containing minerals. More particularly, the present invention pertains to the treatment of potassium-containing mineral salts with specific conditioning agents making them more amenable to electrostatic separation. In a specific aspect, the present invention is concerned with the isolation of langbeinite $$(K_2SO_4 \cdot 2MgSO_4)$$

from saline deposits.

It is well known that the recovery of inorganic salts, such as alkali metal salts and earth alkali metal salts, from natural salt beds by means of electrostatic separation offers vrious advantages. Thus, being a "dry" process, electrostatic seapration does not involve the handling and pumping of huge volumes of aqueous solutions. Furthermore, due to the absence of water, the cost of drying wet materials is eliminated. Another virtue of dry separation processes is that their mechanical energy requirements are considerably lower than those of wet processes. Finally, in wet separation methods, such as solution and crystallization processes as well as flotation, there is always a possibility of chemical reactions between these salts, which are generally not stable in contact with saline liquors.

In view of the advantages inherent in dry salt recovery processes, there is a trend in industry towards applying electrostatic separations toa n ever increasing number of minerals. However, many salt mixtures occurring in saline deposits do not lend themselves to electrostatic separations. Thus, it was heretofore impossible to separate langbeinite ($K_2SO_4 \cdot 2MgSO_4$) from the other potassium-containing salts occurring with this mineral in natural salt beds by means of an electrostatic process.

It is therefore an object of the present invention to provide an improved process for the electrostatic separation of mineral salts.

Another object of the present invention is to broaden the applicability of eelctrostatic separation processes.

A further object of the present invention is to render potassium-containing salts more amenable to electrostatic separations.

Another object of the present invention is to provide an electrostatic process for the separation of langbeinite ($K_2SO_4 \cdot 2MgSO_4$) from the other minerals occurring with this double salt in saline deposits.

A further object of the present invention is to provide a process for the recovery of kieserite ($MgSO_4 \cdot H_2O$) from potassium-containing minerals.

Still further objects will appear hereinafter.

With the above objects in view, the present invention mainly consists in a process for the electrostatic separation of potassium-containing mineral salt mixtures into individual components, said process comprising the step of contacting a crushed potassium-containing mineral salt mixture with a small proportion of a particular conditioning agent to thereby condition the potassium-containing mineral composite and make it more amenable to electrostatic separation.

The particular conditioning agents used in this step of the process of the present invention and referred to herein as "type II conditioning agents" include chlorophenoxy acetic acid, dichlorophenoxy acetic acid and trichlorophenoxy acetic acid, chlorobenzoic acid, dichloro benzoic acid, dihydroxy benzoic acid, dichloro phenol and the salts of these compounds.

In accordance with a preferred embodiment of the present invention, a mineral salt mixture or composite comprising langbeinite ($K_2SO_4 \cdot 2MgSO_4$) and rock salt (halite, NaCl) is crushed to form small particles, the particles of the mineral composite are contacted with a "type II conditioning agent" as defined above, and the conditioned mineral particles are then subjected to electrostatic separation whereby the langbeinite is isolated from the mineral composite.

The process of the presentinvention is applicable not only to the separation of langbeinite and rock salt but also to the recovery of langbeinite and other mineral salts, such as kieserite ($MgSO_4 \cdot H_2O$), from natural salt beds containing rock salt and potassium salts. Among the salt mixtures or mineral composites occurring in saline deposits which can be separated by the process of this invention are, in addition to langbeinite-rock salt mixtures, (1) mixtures of langebeinite with sylvinite, which is composed of sylvite (KCl) and halite (NaCl), and (2) mixtures of langbeinite with hartsalz, which is composed of sylvite (KCl), halite (NaCl) and kieserite $$(MgSO_4 \cdot H_2O)$$

When aplying the process of the present invention to such naturally occurring mineral salt mixtures or composites, one obtains besides pure langbeinite the other mineral salts present in the mixture, such as sylvite and kieserite, which can be isolated in a highly concentrated or pure form siutable for use as fertilizer or chemical reactant.

Depending upon the composition of the mineral composite to be separated into its components and the degree of separation desired, the process of the present invention includes a varying number of steps. Thus, the separation of langbeinite from rock salt according to this invention comprises the steps of contacting a crushed mixture of the two salts with a "type II conditioning agent" and subjecting the conditioned mixture to electrostatic separation.

When applied to the separation of a mineral mixture or composite composed of langbeinite, rock salt and kieserite, the process of the present invention comprises the steps of contacting a crushed mixture of the salts with a "type II conditioning agent" as defined above, subjecting the conditioned mixture to electrostatic separation into rock salt and a mixture of langbeinite and kieserite, and subjecting the mixture of langbeinite and kieserite to a second electrostatic separation to thereby separate the langbeinite from the kieserite.

Finally, if the mineral salt mixture to be separated contains sylvite, the process of the present invention includes the removal of the sylvite prior to the separation of the remaining salts by contacting the latter with a "type I conditioning agent" and subjecting the conditioned mixture to electrostatic separation. To cite an example, in accordance with this invention, langbeinite is recovered from a mixture of langbeinite and hartsalz, which is composed of sylvite rock salt and kieserite by at first removing sylvite and then conditioning and separating the remaining components of the mixture, i.e. langbeinite, kieserite and rock salt.

The removal of the sylvite prior to the separation of the other mineral salts is preferably effected by mixing the sylvite-containing mineral salts with a small proportion of an anionic agent capable of forming a negatively charged radical along with splitting off of positive ions, thereby conditioning said mineral salts and making them more amenable to electrostatic separation, and subjecting the thus conditioned mineral salts to electrostatic separation at a temperature between room temperature and about 300° C.

Anionic agents capable of forming a negatively charged radical along with splitting off of positive ions, which can be used to condition the sylvite-containing mineral salts in the sylvite removal step and which are referred to in this specification as "type I conditioning agents" include organic carboxylic acids, sulfonic acids, acid sulfuric acid esters, the salts, amides, imides and anhydrides of these substances, carboxylic acid esters, and all other organic compounds having acidic properties as well as the salts of such compounds such as enols, phenols, naphthols, imides, amides, certain aryl amines, fluorene, anthrone and the salts and esters thereof.

Representative examples of "type I conditioning agents" suitable for conditioning the sylvite-containing mineral salts in the sylvite separation step, include, among others, the sodium salt of oxystearinsulfonic acid, the sulfate of oxystearic acid amide, the sodium salt of a sulfonated naphthylester, sodium acetate, oleic acid, rincinic acid, oxystearic acid, glutamic acid, mixtures of fatty acids $C_3$–$C_{10}$, mixtures of fatty acids $C_7$–$C_{12}$, mixtures of fatty acids $C_{12}$–$C_{18}$, linseed oil fatty acids, naphthenic acids (crude), shellac, alizarine yellow G (Color Index No. 36), Eosine (Color Index No. 768), Uranine (Color Index 766), benzoic acid, p-toluic acid, phenylacetic acid, cinnamic acid, salicylic acid, acetylsalicylic acid, phthalic acid, benzo orange R (Color Index No. 415), Glycocolldodecylester, rhodamine 3B extra (Color Index No. 751), olive oil, margarine, pentachlorophenol, alpha-nitroso-beta-naphthol, beta-nitroso-alpha-naphthol, alpha-naphthol, beta-naphthol, pyrocatechol, pyrogallic acid, rosolic acid, murexid, saccharin-orthobenzoic sulfimide, thioglycolic acid-beta-naphthyl-amide, 5 nitrobarbituric acid, the sodium salt of veronal (diethyl-barbituric acid), diphenylthiocarbazone, 1-(4-nitrophenyl)-4-nitro-3-methyl-pyrazolone, Autolrot RLP (Color Index No. 82), anthrone, fluorene, "Phoskresol A" (compound of dithiophosphoric acid with cresol), "Phosokresol C" (compound of dithiophosphoric acid with cresol), 1,2,5,8-tetra-oxyan-thraquinone, the potassium salt of phthalimide, mannite-boric acid 1:1 1:4, pyrocatechol+phthalic acid 100:5, mixture of fatty acids $C_3$–$C_{10}$+sodium salt of alkylsulfonic acid 1:1, nonyl sulfate, the sodium salts of alkylsulfonic acids ("Mersolat 30" "Mersolat D," Bayer), the sodium salt of ricinic acid, the sodium salt of oxystearicsulfonic acid, the sodium salt of alkylbenzenesulfonic acid, the sodium salt of alkylnaphthalenesulfonic acid, "Lichtgrün SF" (Color Index No. 669), the sodium salt of benzylnaphthalenesulfonic acid, the sodium salt of naphthylestersulfonic acid ("Dynesol," Amalgamated Chemical Corp.), sulfonated amides of fatty acids ("Xynomine," Onyx), alkylsulfonate ("Witolatpaste," Imhausen), the sodium salt of oxystearinsulfonic acid ("Prästabitöl")+the sodium salt of sulfonated ricinic acid 1:1, the sodium salt of oxystearinsulfonic acid ("Prästabitöl")+the sodium salts of alkylsulfonic acids ("Mersolat D") 1:1, phthalic acid, salicylic acid, mixtures of fatty acids $C_{14}$–$C_{22}$, rosolic acid, pentachlorophenol, "Phosokresol A" (compound of dithiophosphoric acid with cresol), "Phosokresol B" (compound of dithiophosphoric acid with cresol), tetramethyldiaminobenzophenone (Michler's Ketone, 6 - sulfanil-2,4 - dimethyl - pyrimidine ("Elkosin"), diphenylthiocarbazone, Cupferron (ammonium-nitroso-beta-phenyl hydroxyl-amine), pyrocatechol+phthalic acid 15:1, mannite-boric acid 1:1, sulfonated amides of stearic acid and phenylacetic acid.

As will be set forth in greater detail hereinbelow, the "type I conditioning agents" used in the removal of the sylvite can be divided into two groups of compounds which differ in their effect on the subsequent recovery of langbeinite and kieserite from the mineral salt mixture. The first group of anionic conditioning agents, which for brevity will be referred to as "type Ia conditioning agents," consists of phthalic acid, phthalic anhydride, tetrahydro phthalic anhydride and saccharin, while the second group, which will be referred to hereinbelow as "type Ib conditioning agents" consists of all the other members of the above indicated classes of anionic agents used in the sylvite removal.

The isolation of langbeinite and kieserite from a mixture of langbeinite with hartsalz (which is composed of sylvite, rock salt and kieserite) will now be described in greater detail in order to illustrate, by way of a specific example, a preferred embodiment of the present invention.

The mineral salt mixture to be separated, in the instant case the langbeinite-hartsalz mixture, is at first crushed to the particle size commonly used in electrostatic separations. Depending upon the degree of association or interminglement of the components of the salt mixture, the crushing of the latter may be carried to a particle size of between 0.5 and 2 mm., whereby the mineral components of the mixture are liberated from one another. The crushing of the salt mixture may of course be effected by any suitable salt or ore grinding or breaking appliance.

The subdivided salt mixture is then conditioned by contacting with a "type I conditioning agent." The conditioning agent is generally used in an amount of 25–200 g. per ton of mineral salt mixture, a particularly preferred amount being 50–120 g. per ton of salt mixture. The conditioning is in most cases conducted at a temperature within the range of 20° to 80° C., although higher or lower temperatures may also be employed if desired.

The conditioning agent may be applied to the crushed mineral salt mixture in any suitable manner. A preferred mode of applying the conditioning agent to the salt mixture involves contacting the latter with a dilute solution of the conditioning agent in a diluent while agitating the mixture so as to achieve an even distribution of the conditioning agent over the surface of the salt particles. The contacting may be done by dripping or spraying the solution onto the agitated salt mixture and it has been found advantageous to continue the agitation of the mixture after the application of the solution in order to ensure that the conditioning agent comes into contact with all salt particles. The agitation and mixing may be carried out in any effective mixing apparatus adapted to this type of operation. In some cases, it is advantageous to effect the mixing in a conveyor having some sort of mixing action such as a screw conveyor. Suitable diluents for preparing solutions of the conditioning agent are all inert liquids which can be easily removed after the application of the solution, such as water and alcohol.

The conditioning agent may also be applied in its pure state, i.e. as undiluted liquid or solid. In the latter case, an intimate contact of the conditioning agent with the salt particles must be accomplished by the use of a powerful mixing device. Another possibility is to vaporize the conditioning agent and to apply it to the salt mixture in vapor form, for example in a zone, where the salt particles are maintained in a fluid state. An alternative to this procedure involves heating the conditioning agent above its melting point and mixing the melt with the salt particles at a temperature above the melting point of the conditioning agent. It is of course also possible to apply the conditioning agent in solid form to a salt mixture heated at a temperature above the melting point of the conditioning agent so as to contact the latter in its molten state with the salt particles.

It may thus be seen that there exist many ways of applying the conditioning agent to the salt mixture, the only unvarying condition being an intimate contact of the conditioning agent with the salt particles to ensure an even distribution of the former on the surface of the latter.

If the conditioning agent is applied in the form of a solution in a solvent, the solvent must be removed from the salt mixture before the latter is charged into the electrostatic separator. This can be done by any conventional method. A preferred method of removing the solvent from the conditioned salt mixture consists in blowing hot air or a hot gas through the salt mixture. In this manner, it is possible to completely remove the solvent while at the same time heating the salt mixture to the temperature required for the electrostatic separation. The separation temperature is generally within the range of 40° to 150° C., temperatures between 50° and 100° C. being particularly suitable.

The separation temperatures and the concentrations of "type I conditioning agents" used in the practice of this invention have been stated hereinabove in terms of temperature and concentration ranges. Within these ranges, the most advantageous separation temperature and the optimum amount of "type I conditioning agent" in each particular case can be found by simple trial runs.

In order to avoid unnecessary repetitions in the description of the present invention, it is to be understood that the conditioning of the salt mixtures in the subsequent stages of our process with the same or other conditioning agents is effected in substantially the same manner as described above.

The salt mixture thus conditioned with a "type I conditioning agent" is then charged into an electrostatic separator of known construction. Highly efficient types of apparatus widely used in electrostatic separations and suitable for the purpose of this invention are roll separators and the so-called free-fall separators. Employing a field strength of 3–9 kv./cm., the conditioned salt mixture is separated into two or three fractions.

In a typical example, this separation will lead to a sylvite concentrate containing about 30–40% $K_2O$, a residue containing the rock salt and the sulfates (langbeinite and kieserite), and optionally an intermediate fraction of a composition approximating that of the salt mixture charged into the separator. By means of one or more further concentration steps, the sylvite concentrate can easily be purified to a $K_2O$ content of 60%.

Since it is common practice to discharge the product from multi-step separators in several fractions, i.e. to withdraw two or three fractions in each separator step, one of said fractions being fed to the subsequent separator step and the other fractions being withdraw from the separation process as finished product or refuse or being returned to a preceding separator step as intermediate material, it is advisable to process the fractions of medium composition obtained in the sylvite removal by returning them to a separator step where the salt has about the same concentration.

The residue containing the sulfates is passed to the next step of the process according to the present invention. In this step, the salt mixture, freed from sylvite and composed of langbeinite, kieserite and rock salt, is conditioned with a "type II conditioning agent" as defined above. As already pointed out, the conditioning with the "type II conditioning agent" may be effected in the same manner as the above described conditioning with the "type I conditioning agent."

It is especially advantageous to conduct the conditioning of the salt mixture with the "type II conditioning agent" at the temperature of the sylvite removal, if this temperature does not exceed 80° C.

The optimum amount of "type II conditioning agent" used in this step and the optimum separation temperature in each particular case can be ascertained by simple trial runs. In general, the amount of "type II conditioning agent" will be within the range of about 25 to about 200 g., preferably 50 to 100 g. per ton of salt mixture, while the separation temperature will range from about 40° to about 120° C., preferably 50° to 100° C. as in the preceding separation step.

After removing the solvent, if any, and heating the salt mixture to the optimum separation temperature, the conditioned material is charged into an electrostatic separator of conventional construction, such as a roll or free-fall type separator, using a field strength of 3–9 kv./cm.

It has been found in accordance with this invention that the nature of the conditioning agent used in the first separation step (sylvite removal) determines the result of the separation effected in the second separation step, to which the sylvite-free salt mixture is subjected. If the conditioning agent utilized in the first separation step is a "type Ia conditioning agent" as defined above, the second separation step results in the separation of langbeinite from kieserite with the rock salt being present in both fractions in about equal proportions. On the other hand, if the conditioning agent employed in the first separation step is a "type Ib conditioning agent" as defined above, the second separation step leads to a separation of the sulfates (langbeinite and kieserite) from the rock salt, the sulfates being present in one fraction and rock salt going into the other fraction.

The first result, i.e. the separation of langbeinite from kieserite in the second separation step, is also obtained if the sylvite removal in the first separation step is carried out with a salt mixture conditioned with a "type Ib conditioning agent" and a "type Ia conditioning agent" is used concurrently with a "type II conditioning agent" in the second separation step. When working according to this embodiment of the present invention, it is not necessary to increase the total amount of conditioning agents utilized in the second separation step. In most cases, it suffices to replace part of the "type II conditioning agent" with a "type Ia conditioning agent."

It can thus be seen that in the absence of "type Ia conditioning agents," the "type II conditioning agents" utilized in the second separation step effect on electrostatic separation of the sulfates from the rock salt. In the presence of a "type Ia conditioning agent," the sulfates are separated from each other, but not from the rock salt, in the second separation step, it being immaterial whether the "type Ia conditioning agent" serves to condition the salt mixture prior to the first separation step (sylvite removal) or is used along with a "type II conditioning agent" the condition of the sylvite-free salt mixture prior to the second separation step.

The langbeinite concentrates obtained as the products of the second separation step will have a varying $K_2O$ content, depending upon the composition of the mineral salt mixture subjected to the process of the invention. In the case of the salt mixtures used by us the $K_2O$ content of the langbeinite concentrate obtained ranged from about 10 to about 12%, corresponding to a langbeinite content of 50%.

In order to obtain the langbeinite in a pure form, it is necessary to subject the concentrate resulting from the second separation step to a third process step, the so-called after-concentration. A conditioning prior to the third step is generally not required but may be advantageous in certain cases.

The salt mixture subjected to the third step consists of either langbeinite and kieserite (plus a small amount of rock salt, if any) or langbeinite and rock salt, depending upon the nature of the "type I conditioning agent" used in the first or second separation step.

The fact that a new conditioning treatment prior to the third step is not absolutely necessary even when working up langbeinite-kieserite mixture can be explained by means of Coehn's rule: In the absence of rock salt, the electrification, occurring in the feeder member of the electrostatic separator on account of friction, leads to unlike charges in the langbeinite and kieserite, whereas in the presence of rock salt, langbeinite and kieserite acquire like charges and rock salt acquires a charge of opposite sign.

Although a new conditioning of the salt mixture is not absolutely necessary in most cases, it may be advantageous to condition the langbeinite concentrate obtained from the second step before subjecting this material to the third separation step. This conditioning (after-conditioning) is carried out by treating the salt with a "type II conditioning agent," advantageously with concurrent use of phthalic acid, phthalic anhydride or another "type I conditioning agent." The amount of the conditioning agent(s) and the separation temperature are preferably the same which are employed in the second separation step.

The langbeinite concentrates obtained from the third step are frequently of 95 to 98% purity. If the purity is lower or insufficient for the use of the material, a purity of nearly 100% can be achieved by a further concentration step.

In the same way, the kieserite fractions obtained from the second or third separation step can be purified. Such a purification is for example indicated if the kieserite is to serve as starting material for the production of potassium or sodium sulfate. It is easy to obtain kieserite concentrates of over 95% purity by the process of this invention.

The three specific embodiments of the present invention described above are schematically illustrated in the attached flow sheets.

Referring more particularly to the drawing, FIG. 1 shows the embodiment wherein a "type Ib conditioning agent" is used in the first separation step (sylvite removal) while a "type II conditioning agent" is used in the second separation step. In view of the absence of a "type Ia conditioning agent," the second separation steps leads to (a) rock salt, and (b) a mixture of langbeinite and kieserite. In the third separation step, where the use of a conditioning agent is optional, langbeinite and kieserite are separated from each other.

According to the embodiments of the present invention illustrated in FIGS. 2 and 3, a "type Ia conditioning agent" is used in the first separation step and in the second separation step, respectively. Owing to the presence of the "type Ia conditioning agent," the second process step results in a separation of langbeinite from kieserite but both mineral salts contain about equal proportions of rock salt. In order to purify the langbeinite and kieserite fractions, they are subjected to the third process step where the rock salt is removed therefrom. Again, the use of a conditioning agent in the third step is optional.

The following examples are additionally illustrative of the present invention but are not to be construed as limiting the scope thereof.

EXAMPLE 1

The experiments tabulated in Table I were carried out with a langbeinite-containing hartsalz of the following composition:

14.8% langbeinite,
16.5% sylvite,
11.0% kieserite,
55.9% rock salt, and
1.8% water insoluble material The salt mixture was ground to a particle size of 0.6 mm. in order to mechanically free the components from each other. The conditioning treatment in the individual steps was effected by spraying a solution of the conditioning agents listed in columns 2, 9 and 16 of Table I onto the salt mixture being agitated in a mixing apparatus until the amounts indicated in columns 3, 10 and 17 had been applied to the salt. During the spraying operation and for 15 minutes thereafter, the ground salt was vigorously mixed. Then the solvent was removed by blowing a stream of hot air through the salt mixture while at the same time heating the material to the separation temperatures stated in columns 4, 11 and 18. The salt mixture thus conditioned was passed through a three-step roll separator into which it was charged by a shaking trough. The separation occurred under the force of the electric fields indicated in columns 5, 12 and 19 between the grounded rolls and their counter electrodes. In this manner, there were obtained the fractions whose $K_2O$ content and langbeinite content, respectively, are indicated in columns 6 and 7, 13 and 14, and 20 to 23. The residue after the sylvite removal (column 6) was the material charged into the second separation step where the langbeinite was obtained in the form of a first concentrate. The symbol "+" appearing opposite some entries in the table designates the fractions containing the kieserite.

The langbeinite concentrate (column 14) obtained in the second separation step (langbeinite preconcentration) was passed on to the third step where the langbeinite after-concentration was carried out. The residue of the second step was removed from the process. The residue of the third step contained the rock salt and, if marked by a + sign, also the kieserite. This residue was discarded if its $K_2O$ content was below 1.5% or combined with the intermediate fraction if its $K_2O$ content was above 1.5%. When working in a continuous manner, the intermediate fraction was returned to the second step (langbeinite preconcentration). The material designated as langbeinite "after-concentrate" was the langbeinite product obtained. It can be purified by a further concentration step.

In Table I and the following Tables II and III, these abbreviations are used for the sake of brevity:

ClPhOA=chloro phenoxy acetic acid
DPhOA=dichloro phenoxy acetic acid
TPhOA=Trichloro phenoxy acetic acid
Phth.acid=phthalic acid
ClB=chloro benzoic acid
DClB=dichloro benzoic acid
DOB=dihydroxy benzoic acid
Phth.An.=phthalic anhydride.

Table I

STEP 1.—SYLVITE REMOVAL

| 1 | 2 | 3 | 4 | 5 | 6 | 7 | 8 |
|---|---|---|---|---|---|---|---|
| No. of run | Conditioning Agent | Amount g./t. | Separation temp., °C. | Separation potential, kv./cm. | Residue (langbeinite), percent $K_2O$ | KCl pre-concentrate percent $K_2O$ | $K_2O$ yield in KCl preconcentrate,[1] percent |
| 1 | Na-salt of fatty acid mixture $C_4$-$C_{10}$ | 25 | 60 | 7-8-9 | 4.8 | 31.6 | 76.9 |
| 2 | Sulfonated fatty acid amide | 100 | 60 | 5-7-9 | 5.4 | 29.1 | 74.8 |
| 3 | Na-salt of fatty acid mixture $C_4$-$C_{10}$ | 100 | 40 | 5-7-9 | 4.7 | 33.5 | 78.4 |
| 4 | Cinnamic acid | 200 | 80 | 5-6-8 | 4.8 | 38.2 | 76.4 |
| 5 | α-Nitroso-β-naphthol | 200 | 150 | 4-6-8 | 4.6 | 41.1 | 75.1 |
| 6 | Sodium hydroxy stearyl sulfonate Na | 100 | 40 | 5-7-9 | 6.0 | 29.0 | 71.2 |
| 7 | Na-salt of fatty acid mixture $C_4$-$C_{10}$ | 100 | 80 | 5-7-9 | 5.3 | 40.6 | 70.8 |
| 8 | Na-salt of fatty acid mixture $C_4$-$C_{10}$ | 25 | 40 | 5-7-9 | 5.0 | 40.3 | 72.8 |
| 9 | Saccharin | 100 | 40 | 3-5-7 | 5.6 | 31.2 | 72.4 |
| 10 | Phthalic acid | 100 | 80 | 3-5-7 | 5.7 | 29.7 | 73.6 |
| 11 | Phthalic anhydride | 100 | 40 | 5-7-9 | 5.1 | 38.7 | 72.5 |
| 12 | Tetrahydro phthalic anhydride | 100 | 80 | 5-7-9 | 5.6 | 31.0 | 72.4 |
| 13 | Na-salt of fatty acid mixture $C_4$-$C_{10}$ | 100 | 60 | 5-7-9 | 5.3 | 31.0 | 75.6 |
| 14 | Na-salt of fatty acid mixture $C_4$-$C_{10}$ | 100 | 60 | 5-7-9 | 4.7 | 33.5 | 78.4 |
| 15 | Fatty acid glycerol ester | 50 | 60 | 5-7-9 | 5.8 | 37.1 | 68.8 |
| 16 | Oleyl oleate | 100 | 60 | 5-7-9 | 5.4 | 30.0 | 74.1 |

STEP 2.—LANGBEINITE PRECONCENTRATION

| 1 | 9 | 10 | 11 | 12 | 13 | 14 | 15 |
|---|---|---|---|---|---|---|---|
| No. of run | Conditioning agent | Amount g./t. | Separation temp., °C. | Separation potential kv./cm. | Residue percent $K_2O$ | Langbeinite preconcentrate, percent $K_2O$ | $K_2O$ Yield in langbeinite preconcentrate[1] percent |
| 1 | 2,4-DPhOA | 100 | 60 | 5-7-9 | 1.2 | 10.5+ | 19.6 |
| 2 | 2,4,5-TPhOA | 200 | 80 | 5-6-9 | 1.6 | 9.7+ | 21.3 |
| 3 | 2,5-DClB | 100 | 40 | 5-7-9 | 0.8 | 11.0+ | 18.4 |
| 4 | o-ClPhOA | 50 | 80 | 9-9-9 | 0.9 | 11.5+ | 22.4 |
| 5 | Phthalic acid / 2,4-DPhOA-Na | 50 / 100 | 150 | 3-5-7 | 1.4+ | 9.8 | 20.2 |
| 6 | Phthalic acid / 3,4-DClB | 50 / 50 | 60 | 8-8-9 | 1.6+ | 11.2 | 24.7 |
| 7 | Phthalic anhydride / 2,4-DOB | 50 / 50 | 80 | 8-8-9 | 1.1+ | 12.1 | 25.4 |
| 8 | Phthalic anhydride / 2,4-dichlorophenol | 50 / 100 | 60 | 7-8-9 | 0.9+ | 10.8 | 24.3 |
| 9 | Phthalic acid / 2,4-DPhOA-Na | 50 / 100 | 100 | 3-5-7 | 1.3+ | 10.6 | 24.1 |
| 10 | Na-pClPhOA | 100 | 120 | 5-7-9 | 1.1+ | 11.0 | 18.8 |
| 11 | 2,4-DPhOA | 100 | 40 | 5-7-9 | 1.7+ | 12.5 | 21.2 |
| 12 | Phthalic anhydride / 2,5-DClB | 50 / 100 | 80 | 5-7-9 | 1.0+ | 10.5 | 25.4 |
| 13 | 2,4-DPhOA | 100 | 80 | 5-7-9 | 1.5 | 10.3+ | 18.3 |
| 14 | 2,4-DClB | 80 | 60 | 5-7-9 | 0.9 | 11.0+ | 18.4 |
| 15 | 2,4-DPhOA | 25 | 60 | 5-7-9 | 1.6 | 10.2+ | 26.8 |
| 16 | 2,4-DPhOA | 25 | 60 | 5-7-9 | 1.5 | 9.6+ | 22.2 |

[1] Based on total $K_2O$ of raw salt mixture (100%).

STEP 3.—LANGBEINITE AFTER CONCENTRATION

| 1 | 16 | 17 | 18 | 19 | 20 | 21 | 22 | 23 | 24 |
|---|---|---|---|---|---|---|---|---|---|
| No. of run | Conditioning agent | Amount g./t. | Separation temp., °C. | Separation potential kv./cm. | Residue, percent $K_2O$ | Medium fraction, percent $K_2O$ | Langbeinite after concentration Percent $K_2O$ | Langbeinite after concentration Percent Lgbt | Total $K_2O$ yield,[2] percent |
| 1 | Phthalic acid / 2,4-DPhOA | 50 / 100 | 60 | 3-5-7 | 1.9+ | 5.0 | 17.8 | 78.4 | 96.5 |
| 2 | Phthalic acid / 2,4,5-TPhOA | 50 / 100 | 80 | 3-5-7 | 2.4+ | 7.1 | 22.4 | 98.7 | 96.1 |
| 3 | Phthalic anhydride / 2,5-DClB | 50 / 100 | 40 | 5-7-9 | 1.0+ | 7.6 | 17.8 | 78.4 | 96.8 |
| 4 | Phthalic anhydride / o-ClPhOA | 50 / 100 | 80 | 7-8-9 | 1.4+ | 6.2 | 21.7 | 95.4 | 96.8 |
| 5 | | | 150 | 7-7-7 | 2.8 | | 16.5 | 72.7 | 95.3 |
| 6 | Phthalic acid / 3,4-DClB | 50 / 50 | 60 | 3-5-7 | 2.1 | 8.0 | 21.6 | 95.2 | 95.9 |
| 7 | | | 80 | 9-9-9 | 1.2 | | 17.2 | 75.8 | 96.2 |
| 8 | Phthalic anhydride / 2,4-dichlorophenol | 50 / 100 | 80 | 5-7-9 | 1.8 | 7.1 | 21.1 | 93.0 | 97.1 |
| 9 | | | 120 | 6-7-9 | 2.0 | | 18.1 | 79.7 | 96.5 |
| 10 | p-ClPhOA-Na | 100 | 120 | 5-7-9 | 1.6 | 6.9 | 21.6 | 95.2 | 92.4 |
| 11 | 2,4-DPhOA | 25 | 60 | 5-7-9 | 2.5 | | 17.5 | 77.1 | 93.7 |
| 12 | | | 80 | 9-9-9 | 2.1 | 9.9 | 23.0 | >100 | 97.8 |
| 13 | | | 80 | 5-7-9 | 2.1+ | 6.3 | 21.5 | 94.6 | 93.9 |
| 14 | | | 80 | 5-7-9 | 1.0+ | 7.6 | 22.4 | 98.6 | 96.8 |
| 15 | α-Nitroso-β-naphthol | 25 | 60 | 5-7-9 | 2.0+ | 5.8 | 18.3 | 80.6 | 95.6 |
| 16 | 2,4-DPhOA / α-Nitroso-β-naphthol | 25 / 25 | 60 | 5-7-9 | 1.8+ | 7.1 | 18.6 | 82.0 | 96.3 |

[2] Based on total $K_2O$ content of raw salt mixture (100%). Sum of percentages indicated in Columns 8 and 15.

The langbeinite "after-concentrate" obtained in Run No. 12 seemed to contain more than 100% of langbeinite (see column 23 of Table I). The reason for this unrealistic langbeinite content is due to the fact that the langbeinite amount was calculated from the $K_2O$ content (column 22) of the material. Since 100% (i.e. pure) langbeinite contains only 22.7% of $K_2O$, a $K_2O$ content of 23.0% indicates that the material contained some sylvite besides langbeinite.

When applied to mineral composites or mixtures composed of langbeinite and sylvinite (which consists of sylvite and rock salt), i.e. mixtures that are free of kieserite, the process of the present invention is simpler because the separation of the sulfates (langbeinite and kieserite) from each other becomes unnecessary.

In this case, the following procedure can be followed in accordance with this invention:

The sylvite removal in the first step is carried out in the same manner and with the aid of the same "type I conditioning agents" as in the above described separation of the 4-component system langbeinite, sylvite, rock salt and kieserite. The langbeinite remains nearly quantitatively in the residue of the sylvite removal, said residue containing besides langbeinite only rock salt and a small amount of sylvite. The sylvite concentrate is further concentrated by a repeated electrostatic separation, whereas the langbeinite-containing residue constitutes the starting material for the second separation step.

The conditioning in the second step is effected with the same "type II conditioning agents" which are used in the second step of the above described separation. Likewise, the amounts of conditioning agent and the separation temperatures are the same as indicated above.

As may be seen from the separation runs listed in Table II, it may be advantageous, although not necessary, to use in the second step, concurrently with the "type II conditioning agent," phthalic acid, phthalic anhydride or another "type I conditioning agent" in order to recover the sylvite left in the starting material for the second step together with the langbeinite so that the $K_2O$ amount represented by the sylvite does not get lost.

The langbeinite concentrates obtained in the second step are preferably further concentrated, which is done in a third separation step ("after-concentration"). As is the case of the 4-component system whose separation is described above, it is not necessary to condition the salt prior to the third step, but it frequently suffices to vary the separation conditions, for example, by increasing the separation temperature. However, if a new conditioning treatment appears to be indicated, a type II conditioning agent is utilized. This "type II conditioning agent" may be either the same which was used in the second separation step or a different member selected from this class of conditioning agents.

EXAMPLE 2

The experiments listed in Table II were carried out with a langbeinite-containing sylvinite of the following composition:

30.2% langbeinite,
15.3% sylvite,
53.9% rock salt, and
0.6% insoluble material

The conditioning treatments and the separations were performed as described in Example 1. The columns of Table II correspond to those of Table I so that the explanations of Table I given in Example 1 apply also to Table II.

*Table II*

STEP 1.—KCl REMOVAL

| 1 | 2 | 3 | 4 | 5 | 6 | 7 | 8 |
|---|---|---|---|---|---|---|---|
| No. of run | Conditioning agent | Amount g./t. | Separation temp., °C. | Separation potential, kv./cm. | Residue (langbeinite), percent $K_2O$ | KCl preconcentrate, percent $K_2O$ | $K_2O$ yield in KCl preconcentrate,[1] percent |
| 1 | Sodium hydroxy stearyl sulfonate | 100 | 60 | 5-7-9 | 10.0 | 32.1 | 57.3 |
| 2 | Fatty acid mixture $C_4$-$C_{10}$ | 100 | 60 | 5-7-9 | 9.6 | 37.4 | 54.4 |
| 3 | Na-salts of fatty acids $C_4$-$C_{10}$ | 25 | 80 | 6-9-9 | 9.3 | 42.3 | 55.9 |
| 4 | Sulfonated fatty acid amide | 100 | 120 | 5-7-9 | 9.4 | 36.1 | 58.2 |
| 5 | Phthalic anhydride | 100 | 60 | 5-7-9 | 8.9 | 40.9 | 58.9 |
| 6 | Oleyl oleate | 100 | 60 | 5-7-9 | 9.7 | 31.6 | 59.6 |
| 7 | Cinnamic acid<br>Phthalic acid | 50<br>50 | 80 | 3-5-7 | 8.8 | 38.9 | 60.4 |
| 8 | Fatty acid glycerol ester | 100 | 60 | 5-7-9 | 10.2 | 30.9 | 56.9 |
| 9 | α-Nitroso-β-naphthol | 200 | 40 | 5-7-9 | 8.9 | 41.1 | 58.8 |
| 10 | Sodium phthalate | 50 | 40 | 3-5-7 | 9.7 | 40.0 | 54.3 |

STEP 2.—LANGBEINITE PRECONCENTRATION

| 1 | 9 | 10 | 11 | 12 | 13 | 14 | 15 | 16 |
|---|---|---|---|---|---|---|---|---|
| No. of run | Conditioning agent | Amount, g./t. | Separation temp., °C. | Separation potential, kv./cm. | Residue, percent $K_2O$ | Medium fraction, percent $K_2O$ | Langbeinite preconcentrate, percent $K_2O$ | $K_2O$ yield in preconcentrate,[1] percent |
| 1 | o-ClPhOA<br>plus<br>Sodium hydroxy stearyl sulfonate | 100<br><br>50 | 40 | 5-7-9 | 1.8 | 5.1 | 15.8 | 38.7 |
| 2 | p-ClPhOA<br>plus<br>Fatty acids $C_4$-$C_{10}$ | 100<br><br>50 | 60 | 5-7-9 | 2.3 | 7.0 | 17.1 | 39.2 |
| 3 | 2,4-DPhOA | 25 | 80 | 5-7-9 | 0.9 | 4.2 | 14.1 | 41.6 |
| 4 | 2,4,5-TPhOA | 200 | 60 | 5-7-9 | 1.6 | 8.1 | 18.1 | 37.4 |
| 5 | p-ClB<br>plus<br>Phthalic anhydride | 50<br><br>50 | 120 | 7-8-9 | 1.0 | 6.7 | 20.4 | 39.0 |
| 6 | o-ClB | 150 | 100 | 5-7-9 | 2.4 | 5.6 | 14.0 | 33.1 |
| 7 | 2,5-DClB<br>plus<br>2,4-DPhOA | 50<br><br>50 | 60 | 3-5-7 | 1.4 | 6.2 | 18.9 | 34.2 |
| 8 | 3,4-DClB | 100 | 80 | 5-7-9 | 2.0 | 8.1 | 15.2 | 39.6 |
| 9 | 2,4-DOB | 50 | 60 | 7-8-9 | 0.8 | 6.8 | 20.1 | 39.8 |
| 10 | 2,4-dichlorophenol<br>plus<br>Phthalic acid | 150<br><br>50 | 40 | 3-5-7 | 1.7 | 4.9 | 15.7 | 40.7 |

[1] Based on total $K_2O$ content of raw salt mixture (100%).

STEP 3.—LANGBEINITE AFTER CONCENTRATION

| 1 | 17 | 18 | 19 | 20 | 21 | 22 | 23 | 24 |
|---|---|---|---|---|---|---|---|---|
| No. of run | Conditioning agent | Amount, g./t. | Separation temp., °C. | Separation potential, kv./cm. | Medium fraction, percent $K_2O$ | Langbeinite after concentration Percent $K_2O$ | Langbeinite after concentration Percent Lgbt | Total K yield,[2] percent |
| 1 | o-ClPhOA<br>plus<br>Sodium hydroxystearyl sulfonate | 100<br><br>50 | 60 | 5-7-9 | 9.2 | 21.4 | 94.3 | 96.0 |
| 2 | 2,4-DPhOA | 25 | 40 | 7-8-9 | 10.5 | 22.1 | 97.4 | 93.6 |
| 3 |  |  | 120 | 5-7-9 | 7.8 | 21.8 | 96.1 | 97.5 |
| 4 |  |  | 120 | 5-7-9 | 12.0 | 20.9 | 92.1 | 95.6 |
| 5 | p-ClB<br>plus<br>Phthalic anhydride | 50<br><br>50 | 40 | 5-7-9 | 14.1 | 22.3 | 98.3 | 97.9 |
| 6 |  |  | 120 | 5-7-9 | 8.7 | 19.9 | 87.7 | 92.7 |
| 7 |  |  | 100 | 3-5-7 | 10.7 | 22.0 | 96.9 | 94.6 |
| 8 |  |  | 120 | 7-8-9 | 9.1 | 20.6 | 90.8 | 95.5 |
| 9 | 2,4-DPhOA | 100 | 60 | 5-7-9 | 12.8 | 22.4 | 98.7 | 96.6 |
| 10 | 2,4-dichlorophenol<br>plus<br>Sulfonated fatty acid amide | 100<br><br>50 | 80 | 3-5-7 | 8.8 | 20.3 | 89.4 | 95.0 |

[2] Based on Total $K_2O$ Content of Raw Salt Mixture (100%) Sum of Percentages in Columns 8 and 15.

When applied to mineral salts or composites containing only rock salt in addition to langbeinite, the process of the present invention is particularly simple since the sylvite removal step can be omitted. In other words, in this case the separation process according to this invention consists only in a first concentration of the langbeinite ("pre-concentration") and in the second concentration step designed to purify the langbeinite concentrate ("after-concentration.")

As the conditioning agent for this embodiment of the process of the present invention, there is used a "type II conditioning agent" as defined above. The conditioning treatment can be conducted according to any of the methods described hereinabove. The amount of the conditioning agent, the temperature and the separation potential are likewise within the ranges indicated above.

EXAMPLE 3

The experiments listed in Table III were carried out with a mineral salt mixture of the following composition:

49.7% langbeinite,
48.8% rock salt, and
1.5% insoluble material.

The conditioning was effected at room temperature, spraying a solution of the conditioning agent onto the salt mixture while vigorously agitating the same. This method was the same which was used in the experiments of Example 1 (Table I). Table III shows all conditions of operation employed in the runs of Example 3.

panying it in nature while at the same time recovering, also in a form sufficiently pure for any desired use, the mineral salts associated with the langbeinite. As compared with the heretofore employed methods of foam flotation and of fractional solution, the process of the invention offers the advantage of being a "dry" process, which avoids the cost involved in circulating enormous volumes of liquids, and does not require the expenditure of large amounts of mechanical energy. Another advantage of the process according to this invention is that chemical reactions between the mineral salt components likely to occur on contact with aqueous carrier and crystallization liquors do not take place. Accordingly, the process of this invention avoids the difficulties caused by such undesirable chemical reactions.

While the invention has been described with reference to specific embodiments, it will be apparent to those skilled in the art that various modifications may be made and equivalents substituted therefor without departing from the principles and true nature of the present invention.

What is claimed as new and desired to be secured by Letters Patent is:

1. In a method for the electrostatic separation of saline deposits containing langbeinite into individual components, the improvement which comprises contacting a crushed portion of a saline deposit with a small proportion of an agent selected from the group consisting of chlorophenoxy acetic acid, dichlorophenoxy acetic acid, trichlorophenoxy acetic acid, chlorobenzoic acid, dichlorobenzoic

*Table III*

STEP 1.—PRECONCENTRATION

| 1 | 2 | 3 | 4 | 5 | 6 | 8 | 8 | 9 |
|---|---|---|---|---|---|---|---|---|
| | | | | | | Medium fraction, percent $K_2O$ | Preconcentrate | |
| No. of run | Conditioning agent | Amount, g./t. | Separation temp., °C. | Separation potential, kv./cm. | Residue, percent $K_2O$ | | Percent $K_2O$ | Percent Lgbt |
| 1 | o-ClPhOA | 150 | 40 | 5-7-9 | 1.6 | 9.3 | 19.4 | 85.5 |
| 2 | p-ClPhOA | 150 | 60 | 5-7-9 | 0.8 | 7.1 | 18.9 | 83.3 |
| 3 | 2,4-DPhOA | 25 | 40 | 5-7-9 | 0.5 | 4.8 | 22.1 | 97.4 |
| 4 | 2,4,5-TPhOA | 200 | 60 | 5-7-9 | 1.1 | 8.9 | 21.8 | 96.1 |
| 5 | o-ClB | 25 | 80 | 6-7-8 | 1.5 | 7.6 | 16.4 | 72.3 |
| 6 | p-ClB | 150 | 80 | 6-7-9 | 1.4 | 9.5 | 20.1 | 88.6 |
| 7 | 2,5-DClB | 100 | 120 | 3-5-7 | 1.3 | 11.4 | 20.0 | 88.1 |
| 8 | 3,4-DClB | 100 | 60 | 5-7-9 | 0.9 | 10.1 | 21.8 | 96.1 |
| 9 | 2,4-DOB | 100 | 60 | 7-8-9 | 1.1 | 8.8 | 21.7 | 95.6 |
| 10 | 2,4-dichlorophenol | 150 | 100 | 3-5-7 | 2.0 | 7.9 | 15.9 | 70.1 |
| 11 | 2,4-DPhOA / o-ClB | 50 / 50 | 80 | 5-7-9 | 0.5 | 9.1 | 22.0 | 96.9 |
| 12 | 2,4-DPhOA / p-ClPhOA | 50 / 50 | 80 | 5-7-9 | 0.4 | 7.2 | 21.9 | 96.5 |

STEP 2.—AFTER CONCENTRATION

| 1 | 10 | 11 | 12 | 13 | 14 | 15 | 16 | 17 |
|---|---|---|---|---|---|---|---|---|
| | | | | | Medium fraction, percent $K_2O$ | After concentrate | | |
| No. of run | Conditioning agent | Amount, g./t. | Separation temp., °C. | Separation potential, kv./cm. | | Percent $K_2O$ | Percent Lgbt | Yield,[1] percent |
| 1 | o-ClPhOA | 100 | 60 | 5-7-9 | 12.7 | 22.3 | 98.3 | 95.8 |
| 2 | | | 100 | 5-7-9 | 13.1 | 22.1 | 97.4 | 97.9 |
| 3 | | | | | | | | 98.7 |
| 4 | | | | | | | | 97.2 |
| 5 | 2,4-DOB | 50 | 120 | 6-7-8 | 9.5 | 21.4 | 94.3 | 97.1 |
| 6 | 2,4-DPhOA | 150 | | | | | | |
| 7 | p-ClB | 100 | 80 | 6-7-9 | 14.2 | 22.0 | 96.9 | 96.0 |
| | 2,5-DClB | 50 | 100 | 3-5-7 | 15.4 | 22.5 | 99.1 | 95.1 |
| | 2,4-DPhOA | 50 | | | | | | |
| 8 | | | | | | | | 96.5 |
| 9 | | | | | | | | 96.8 |
| 10 | 2,4-DPhOA | 25 | 40 | 3-5-7 | 10.1 | 20.9 | 92.1 | 94.0 |
| 11 | | | | | | | | 98.3 |
| 12 | | | | | | | | 98.6 |

[1] Based on content of raw salt mixture (100%).

As may be seen from the results of the experiments listed in Tables I to III, the process of the present invention makes it possible for the first time to isolate langbeinite in a very pure form from the mineral salts accompanying it acid, dihydroxy benzoic acid, dichlorophenol and the salts of these compounds, thereby conditioning the particles of said saline deposit and making the same more amenable to electrostatic separation.

2. In a method of separating langbeinite from a saline deposit containing langbeinite, the steps of contacting crushed particles of said saline deposit with a small proportion of an agent selected from the group consisting of chlorophenoxy acetic acid, dichlorophenoxy acetic acid, trichlorophenoxy acetic acid, chlorobenzoic acid, dichlorobenzoic acid, dihydroxy benzoic acid, dichlorophenol and the salts of these compounds, thereby conditioning the particles of said saline deposit and making the same more amenable to electrostatic separation; and subjecting the thus conditioned mineral particles to electrostatic separation, thereby isolating the langbeinite therefrom.

3. In a method of separating langbeinite and kieserite from a mineral salt mixture containing the same and also containing rock salt, the steps of contacting crushed particles of said mineral salt mixture with a small proportion of an agent selected from the group consisting of chlorophenoxy acetic acid, dichlorophenoxy acetic acid, trichlorophenoxy acetic acid, chlorobenzoic acid, dichlorobenzoic acid, dihydroxy benzoic acid, dichlorophenol and the salts of these compounds, thereby conditioning the particles of said potassium salt-containing mineral composite and making the same more amenable to electrostatic separation; subjecting the thus conditioned mineral particles to electrostatic separation into rock salt and a mixture of langbeinite and kieserite; and subjecting said mixture of langbeinite and kieserite to a second electrostatic separation so as to separate the langbeinite from the kieserite.

4. In a method of separating langbeinite from a mineral salt mixture containing langbeinite and also containing sylvite, the steps of contacting crushed particles of said mineral salt mixture with a small proportion of an organic anionic agent capable of forming an organic negatively charged radical along with the splitting off of positive ions, said organic negatively charged radical being selected from the group consisting of carboxylic acid, sulfonic acid, enol, phenol, naphthol, imide, amide, aryl amine, fluorone and anthrone and the salts and esters thereof; subjecting the thus conditioned mineral particles to electrostatic separation so as to remove the sylvite therefrom; contacting the remaining particles of said mineral salt mixture with a small proportion of an agent selected from the group consisting of chlorophenoxy acetic acid, dichlorophenoxy acetic acid, trichlorophenoxy acetic acid, chlorobenzoic acid, dichlorobenzoic acid, dihydroxy benzoic acid, dichlorophenol and the salt of these compounds, thereby conditioning the particles of said potassium salt-containing mineral composite and making the same more amenable to electrostatic separation; and subjecting the thus conditioned mineral particles to electrostatic separation, thereby isolating the langbeinite therefrom.

5. In a method of separating langbeinite from a mineral salt mixture containing langbeinite, sylvite and halite, the steps of contacting crushed particles of said mineral salt mixture with a small proportion of an organic anionic agent capable of forming an organic negatively charged radical along with the splitting off of positive ions, said organic negatively charged radical being selected from the group consisting of carboxylic acid, sulfonic acid, enol, phenol, naphthol, imide, amide, aryl amine, fluorone and anthrone and the salts and esters thereof; subjecting the thus conditioned mineral particles to electrostatic separation so as to remove the sylvite therefrom; contacting the remaining particles of said mineral salt mixture with a small proportion of an agent selected from the group consisting of chlorophenoxy acetic acid, dichlorophenoxy acetic acid, trichlorophenoxy acetic acid, chlorobenzoic acid, dichlorobenzoic acid, dihydroxy benzoic acid, dichlorophenol and the salt of these compounds, thereby conditioning the particles of said potassium salt-containing mineral composite and making the same more amenable to electrostatic separation; and subjecting the thus conditioned mineral particles to electrostatic separation, thereby isolating the langbeinite therefrom.

6. In a method of separating langbeinite from a mineral salt mixture containing langbeinite, sylvite, halite and kieserite, the steps of contacting crushed particles of said mineral salt mixture with a small proportion of an organic anionic agent capable of forming an organic negatively charged radical along with the splitting off of positive ions, said organic negatively charged radical being selected from the group consisting of carboxylic acid, sulfonic acid, enol, phenol, naphthol, imide, amide, aryl amine, fluorone and anthrone and the salts and esters thereof; subjecting the thus conditioned mineral particles to electrostatic separation so as to remove the sylvite therefrom; contacting the remaining particles of said mineral salt mixture with a small proportion of an agent selected from the group consisting of chlorophenoxy acetic acid, dichlorophenoxy acetic acid, trichlorophenoxy acetic acid, chlorobenzoic acid, dichlorobenzoic acid, dihydroxy benzoic acid, dichlorophenol and the salt of these compounds, thereby conditioning the particles of said potassium salt-containing mineral composite and making the same more amenable to electrostatic separation; and subjecting the thus conditioned mineral particles to electrostatic separation, thereby isolating the langbeinite therefrom.

7. In a method for the electrostatic separation of saline deposits containing langbeinite into individual components, the improvement which comprises contacting a crushed portion of a saline deposit with 25–200 grams per ton of saline deposit of an agent selected from the group consisting of chlorophenoxy acetic acid, dichlorophenoxy acetic acid, trichlorophenoxy acetic, chlorobenzoic acid, dichlorobenzoic acid, dihydroxy benzoic acid, dichlorophenol and the salts of these compounds thereby conditioning the particles of said saline deposit and making the same more amenable to electrostatic separation.

8. In a method of separating langbeinite from a saline deposit containing langbeinite, the steps of contacting crushed particles of said mineral salt mixture with 25–200 grams per ton of saline deposit of an agent selected from the group consisting of chlorophenoxy acetic acid, dichlorphenoxy acetic acid, trichlorophenoxy acetic acid, chlorobenzoic acid, dichlorobenzoic acid, dihydroxy benzoic acid, dichlorophenol and the salts of these compounds, thereby conditioning the particles of said saline deposit and making the same more amenable to electrostatic separation; and subjecting the thus conditioned mineral particles to electrostatic separation at a temperature of about 40–120° C. and under the force of a field strength of 3 to 9 kv./cm., thereby isolating the langbeinite therefrom.

References Cited in the file of this patent

UNITED STATES PATENTS

| | | |
|---|---|---|
| 2,197,865 | Johnson | Apr. 23, 1940 |
| 2,245,200 | Johnson | June 10, 1941 |
| 2,593,431 | Fraas | Apr. 22, 1952 |
| 2,805,768 | Lawver | Sept. 10, 1957 |
| 2,961,092 | Snow | Nov. 22, 1960 |

OTHER REFERENCES

Industrial and Engineering Chemistry, volume 32, number 5, May 1940, pages 600–604.

Electrostatic Separation of Several Industrial Minerals, American Institute of Mining and Metalurgical Engineer's Technical Publication Number 2408, July 1948, page 3.